United States Patent Office 3,050,525
Patented Aug. 21, 1962

3,050,525
CERTAIN DERIVATIVES OF s-TRIAZOLO [4,3-a]-PYRIDINE
John B. Bicking, 622 Salford Ave., Lansdale, Pa.
No Drawing. Filed Dec. 14, 1960, Ser. No. 75,668
6 Claims. (Cl. 260—296)

This invention relates to 3-substituted pyrido (2.1-c)-s-triazoles and particularly to those having an unsubstituted or an acyl substituted amino lower alkyl group at the 3-position.

The 3-substituted pyrido (2.1-c)-s-triazoles of the present invention can be derived from the process set forth in my U.S. Patent 2,917,511 and comprise compounds having the following formula:

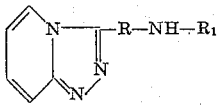

wherein R can be a lower alkyl up to four carbons, preferably methyl and ethyl and $R_1$ is hydrogen or acyl, preferably benzoyl or the residue of a lower aliphatic acid having up to 4 carbon atoms.

The compounds of the present invention are useful as antiinflammatory agents. They may be administered parenterally or orally in conventional pharmaceutical forms in the amounts of .100 to 1.5 gms. daily, preferably in divided does spread over 24 hours.

In order to illustrate the present invention, specific examples of the preparation of a number of compounds within the larger group of compounds encompassed by the present invention are set forth below:

EXAMPLE 1

*Preparation of 3-(Benzamidomethyl) Pyrido (2.1-c)-s-Triazole*

Equimolar quantities of 2-hydrazinopyridine and hippuric acid are heated from 140° C. to 190° C. during one hour. The reaction mixture is cooled and dissolved in 5% hydrochloric acid. The product is precipitated by addition of alkali and recrystallized from isopropyl alcohol to give the pure product in 56% yield. It has a M.P. of 184–186° C. Calculated weight percent for $C_{14}H_{12}N_4O$: C, 66.65; H, 4.79. Found: C, 66.93; H, 4.95.

EXAMPLE 2

*Preparation of 3-(2-Benzamidoethyl) Pyrido (2.1-c)-s-Triazole*

This is prepared in 74% yield using the method of Example 1 from 2-hydrazinopyridine and N-benzoyl-β-alanine. It has a M.P. of 180–181.5° C. Calculated weight percent for $C_{15}H_{14}N_4O$: C, 67.65; H, 5.30. Found: C, 67.61; H, 5.18.

EXAMPLE 3

*Preparation of 3-(Aminomethyl) Pyrido (2.1-c)-s-Triazole Dihydrochloride Is as Follows—*

3-benzamidomethylpyrido (2.1-c)-s-triazole (8.0 g., .032 mole) is dissolved in 25 cc. concentrated hydrochloric acid and heated five hours on a steam bath. The mixture is cooled and the precipitated benzoic acid filtered off. The filtrate is diluted with ethanol to precipitate the product which is recrystallized from an ethanol and 5% hydrochloric acid mixture to give 3.0 g. (43%) of pure product, M.P. 276° C. (decomposition). Calculated weight percent for $C_7H_8N_4 \cdot 2HCl$: C, 38.02; H, 4.56; Cl⁻, 32.07. Found: C, 38.34; H, 4.72; Cl⁻, 32.23. The free base is obtained by the addition of alkali.

EXAMPLE 4

*Preparation of 3-(Aminoethyl) Pyrido (2.1-c)-s-Triazole Dihydrochloride*

This is obtained by starting with the compound of Example 2 and carrying out the hydrolysis reaction of Example 3. The free base is obtained by the addition of alkali. The dihydrochloride melts at 254.5° C.

EXAMPLE 5

*Preparation of 3-(2-Acetylamidoethyl) Pyrido (2.1-c)-s-Triazole*

This is prepared by using the method of Examples 1 and 2 but using N-acetyl-β-alanine instead of N-benzoyl-β-alanine.

What is claimed is:
1. A pyrido (2.1-c)-s-triazole having the formula:

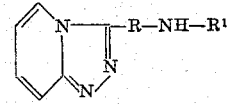

wherein R is lower alkylene having from 1 to 4 carbon atoms and $R^1$ is selected from the group consisting of hydrogen, benzoyl and lower alkanoyl having up to 4 carbon atoms.
2. 3-(benzamidomethyl) pyrido (2.1-c)-s-triazole.
3. 3-(2-benzamidoethyl) pyrido (2.1-c)-s-triazole.
4. 3-(aminomethyl) pyrido (2.1-c)-s-triazole.
5. 3-(2-acetylamidoethyl) pyrido (2.1-c)-s-triazole.
6. 3-(aminoethyl) pyrido (2.1-c)-s-triazole.

References Cited in the file of this patent
UNITED STATES PATENTS
2,917,511     Bicking _____ Dec. 15, 1959

OTHER REFERENCES
Fargher et al.: J. Chem. Soc., vol. 107, pages 688–99 (1915).